United States Patent
Lendle et al.

(10) Patent No.: US 12,270,324 B2
(45) Date of Patent: Apr. 8, 2025

(54) EXHAUST GAS TREATMENT UNIT

(71) Applicant: TENNECO GMBH, Edenkoben (DE)

(72) Inventors: Nils Lendle, Edenkoben (DE); Ralf Mueller, Edenkoben (DE)

(73) Assignee: Tenneco GmbH, Edenkoben (DE)

( * ) Notice: Subject to any disclaimer, the term of this patent is extended or adjusted under 35 U.S.C. 154(b) by 0 days.

(21) Appl. No.: 18/685,033

(22) PCT Filed: Aug. 18, 2022

(86) PCT No.: PCT/EP2022/073033
§ 371 (c)(1),
(2) Date: Feb. 20, 2024

(87) PCT Pub. No.: WO2023/021121
PCT Pub. Date: Feb. 23, 2023

(65) Prior Publication Data
US 2024/0218819 A1   Jul. 4, 2024

(30) Foreign Application Priority Data
Aug. 20, 2021  (DE) .................... 10 2021 121 653.2

(51) Int. Cl.
*F01N 13/00* (2010.01)
*F01N 1/02* (2006.01)
*F01N 3/24* (2006.01)

(52) U.S. Cl.
CPC ......... *F01N 13/0097* (2014.06); *F01N 1/023* (2013.01); *F01N 3/24* (2013.01)

(58) Field of Classification Search
CPC .... F01N 3/0335; F01N 3/2882; F01N 3/2885; F01N 2230/04
See application file for complete search history.

(56) References Cited

U.S. PATENT DOCUMENTS

| | | | | |
|---|---|---|---|---|
| 3,733,181 A | * | 5/1973 | Tourtellotte | B01J 8/06 422/174 |
| 3,768,982 A | * | 10/1973 | Kitzner | B01J 35/30 422/174 |
| 4,851,015 A | * | 7/1989 | Wagner | F01N 3/027 29/520 |

(Continued)

FOREIGN PATENT DOCUMENTS

| | | |
|---|---|---|
| DE | 102013018507 A1 | 5/2015 |
| DE | 112018000554 T5 | 10/2019 |

(Continued)

OTHER PUBLICATIONS

International Search Report (English and German) and Written Opinion of the ISA (German) issued in PCT/EP2022/073033; ISA/EP.

*Primary Examiner* — Matthew T Largi
(74) *Attorney, Agent, or Firm* — Harness, Dickey & Pierce, P.L.C.

(57) ABSTRACT

The disclosure relates to an exhaust gas treatment unit comprising a housing wall comprising at least one first exhaust gas passage opening and at least one heating element for heating an exhaust gas flow, the heating element being placed upstream or downstream of the exhaust gas passage opening, wherein a hood is provided which serves to be placed in front of the exhaust gas passage opening, the heating element being arranged inside the hood and placed in front of the exhaust gas passage opening.

22 Claims, 2 Drawing Sheets

(56) References Cited

U.S. PATENT DOCUMENTS

Figure 1:
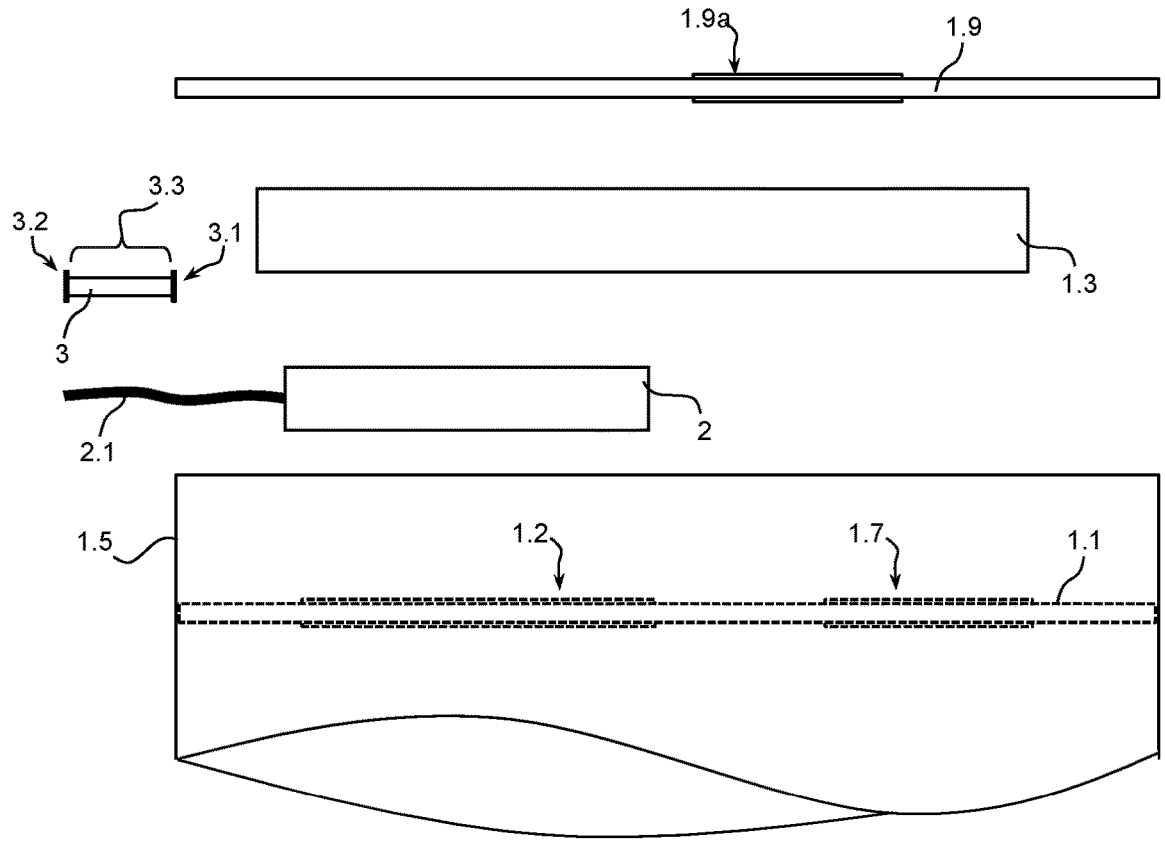

| | | | | |
|---|---|---|---|---|
| 5,285,640 | A | * | 2/1994 | Olivo ................... F01N 3/2006 422/174 |
| 5,972,299 | A | * | 10/1999 | Huang ................. F01N 3/2033 422/174 |
| 7,273,592 | B2 | * | 9/2007 | Jacob ................. F01N 13/0097 60/299 |
| 10,677,126 | B2 | * | 6/2020 | Schlipf .................... H05B 3/48 |
| 2002/0023435 | A1 | * | 2/2002 | Woerner .............. F01N 3/2066 60/299 |
| 2004/0050618 | A1 | * | 3/2004 | Marocco ............... F01N 13/009 181/258 |
| 2006/0101813 | A1 | * | 5/2006 | Wu ...................... F01N 3/2885 60/299 |
| 2006/0266022 | A1 | * | 11/2006 | Woerner ............ F01N 13/0093 60/297 |
| 2006/0283180 | A1 | * | 12/2006 | Hiraga ................. F01N 3/2885 60/299 |
| 2008/0121451 | A1 | * | 5/2008 | Kertz ................... F01N 13/009 180/69.2 |
| 2021/0017891 | A1 | * | 1/2021 | More ................... F01N 3/0335 |

FOREIGN PATENT DOCUMENTS

| | | |
|---|---|---|
| EP | 2014883 A2 | 1/2009 |
| JP | 2005155404 A | 6/2005 |

\* cited by examiner

EXHAUST GAS TREATMENT UNIT

CROSS-REFERENCE TO RELATED APPLICATIONS

This application is a U.S. National Phase Application under 35 U.S.C. 371 of International Application No. PCT/EP2022/073033, filed on Aug. 18, 2022, which claims the benefit of German Patent Application No. 10 2021 121 653.2, filed on Aug. 20, 2021. The entire disclosures of the above applications are incorporated herein by reference.

FIELD

The disclosure relates to an exhaust gas treatment unit comprising a housing wall with at least one first exhaust gas passage opening and at least one heating element for heating an exhaust gas stream, wherein the heating element is positioned upstream or downstream of the exhaust gas passage opening. If the exhaust gas passage opening is an outflow opening, the heating element is positioned upstream of the outflow opening. If the exhaust gas passage opening is an inlet opening, the heating element is positioned downstream of the inlet opening.

BACKGROUND

This section provides background information related to the present disclosure which is not necessarily prior art.

The housing wall can also be designed as an partition wall, an inner wall, an inner wall section, an inner housing section or a housing section. The housing wall can also be designed as a wall section, a pipe section or a flange, each of which has exhaust gas flowing around it on both sides. An partition wall is arranged inside a housing and separates a first housing section from a second housing section.

Exhaust gas treatment units having an electric heating element are already known in the art.

DE 11 2018 000 554 T5 describes an exhaust gas treatment device having a cleaning element having an exhaust gas cleaning substrate with a heat exchanger located axially beyond an axial end of the substrate.

A device for cleaning exhaust gases is already known from EP 2 014 883 A2 having a housing with a hood and openings for the incoming and the outgoing exhaust gas as well as a monolith or a filter. The burn-up of the particles deposited on the filter is effectuated by an electric heater that is integrated into the filter in the area of the hood.

SUMMARY

This section provides a general summary of the disclosure, and is not a comprehensive disclosure of its full scope or all of its features.

The task to be solved by the present disclosure is based on designing and arranging an exhaust gas treatment unit in such a way that improved functionality is guaranteed.

According to the disclosure, the problem is solved in that a hood is provided which serves to be placed in front of the exhaust gas passage opening or to cover the exhaust gas passage opening, the heating element being arranged inside the hood and placed in front of the exhaust gas passage opening. This ensures that the heating element is positioned within the exhaust gas chamber which is bounded by the hood, so that the exhaust gas flowing through the exhaust gas chamber also flows through the heating element. The heating element can be positioned at the respective exhaust gas passage opening.

It can be advantageous in this context if the heating element is fastened or supported on the hood. The hood thus forms a bracket or cantilever for the heating element.

It can also be advantageous if the hood is fastened or supported on the housing wall. The assembly consisting of hood and heating element can therefore be arranged at any position on the housing wall.

It can also be advantageous if a cable duct is provided for the connecting line, wherein the cable duct comprises a first fastening zone via which the cable duct is fastened to the end of the hood. The cable duct ensures a longer service life for the connecting line. The hood forms a bracket or cantilever for fastening the heating element and also a bracket or cantilever for fastening the cable duct. The heating element can be positioned and fixed as required via the hood. The heating element is electrically powered and can be supplied with electricity via the connecting line.

It may advantageously be provided that the hood has a connection opening for the connecting line to pass through, wherein the heating element is positioned directly in the area of the connection opening. The connecting line is routed from the cable duct directly into the heating element and therefore has no contact with exhaust gas.

It can be of a particular importance for the present disclosure if a housing outer wall and/or a housing cover are provided, the cable duct having a second fastening zone arranged opposite the first fastening zone, via which the cable duct is fastened at the end to the housing outer wall or to the housing cover. The housing outer wall and/or a housing cover form a second bracket or cantilever for the cable duct.

In context with the design and arrangement according to the disclosure, it can be advantageous if the housing outer wall or the housing cover has an insertion opening for inserting the connecting line and/or as a receptacle for the second fastening zone of the cable duct. This ensures a good fastening.

It can also be advantageous if the hood together with the housing wall delimits a first exhaust gas chamber, wherein the housing wall together with the housing cover or together with the housing wall and a further housing wall delimits a second exhaust gas chamber, wherein the hood is arranged in the first exhaust gas chamber. Generally, the hood does not form an outer housing cover. However, this would be possible.

It can also be advantageous if the cable duct is arranged in the first exhaust chamber, at least in the area between the two fastening zones.

Furthermore, it can be advantageous if at least one second exhaust gas passage opening is provided in the housing wall, wherein the hood together with the housing outer wall fluidically connects the first exhaust gas passage opening and the second exhaust gas passage opening. The hood is placed on the housing wall. This results in a smaller surface area and therefore less heat loss from the exhaust gas duct formed in this way. The respective first or second exhaust gas passage opening can be an inlet opening or an outlet opening.

It can be advantageous if the hood has a gas exchange opening through which exhaust gas can circulate between the first exhaust gas chamber and the second exhaust gas chamber. The second exhaust gas chamber can be designed as a resonance chamber.

Finally, it can be advantageous if the housing wall has a second gas exchange opening that is positioned outside the hood.

It can also be advantageous if the second exhaust gas chamber can be charged with exhaust gas via the second gas exchange opening.

Further, It can be advantageous if the second exhaust gas chamber together with the second gas exchange opening is designed as a closed Helmholtz resonator.

It can also be advantageous if the cable duct is connected to the cover in a gas-tight manner and/or if the cable duct is connected to the outer wall of the housing or to the housing cover in a gas-tight manner. This is made possible by welding or soldering and serves to protect the connecting line.

It can also be advantageous if the cable duct and the hood are formed in one piece or if the cable duct and the outer wall of the housing or the housing cover are formed in one piece. This makes installation easier.

It can also be advantageous if a catalytic converter is provided downstream of the heating element.

One heating element can be provided for each exhaust gas passage opening or one heating element can be provided for several exhaust gas passage openings Besides the exhaust gas openings, in front of which a heating element is arranged, respectively, the housing wall does not comprise any openings for exhaust gas. Regardless of the exhaust gas openings, the housing wall is therefore free of exhaust gas openings.

The hood is used to divert the exhaust gas flow in relation to the flow direction that is generated by the exhaust gas passage opening.

The heating element is arranged within the exhaust gas chamber that is delimited by the hood, wherein the heating element only partially occupies this exhaust gas chamber so that exhaust gas flows around the heating element.

The exhaust chamber, which is delimited by the hood, is free of additive injection devices.

Exhaust gas also flows through the heating element. Only the exhaust gas flow that passes through the respective exhaust gas passage opening before or after which the heating element is positioned flows through the heating element.

In addition, an exhaust gas treatment unit as described above can be advantageous as a part of an exhaust gas treatment box comprising at least two different exhaust gas purification or cleaning components and a common outer housing as well as a common exhaust gas inlet and a common exhaust gas outlet.

Ultimately, a system consisting of an exhaust gas treatment unit as described above and all other components of an exhaust gas treatment unit for an internal combustion engine, i.e. further catalytic converters, silencers and exhaust pipes, can be advantageous.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
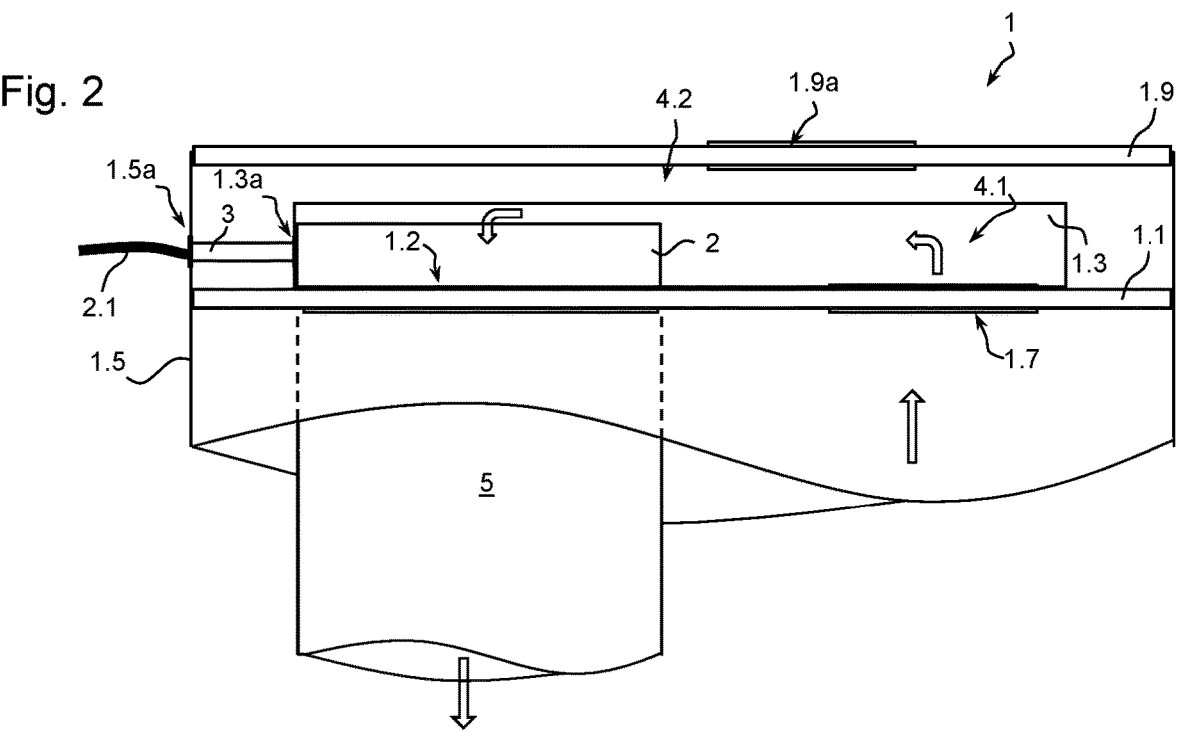
Figure 3:
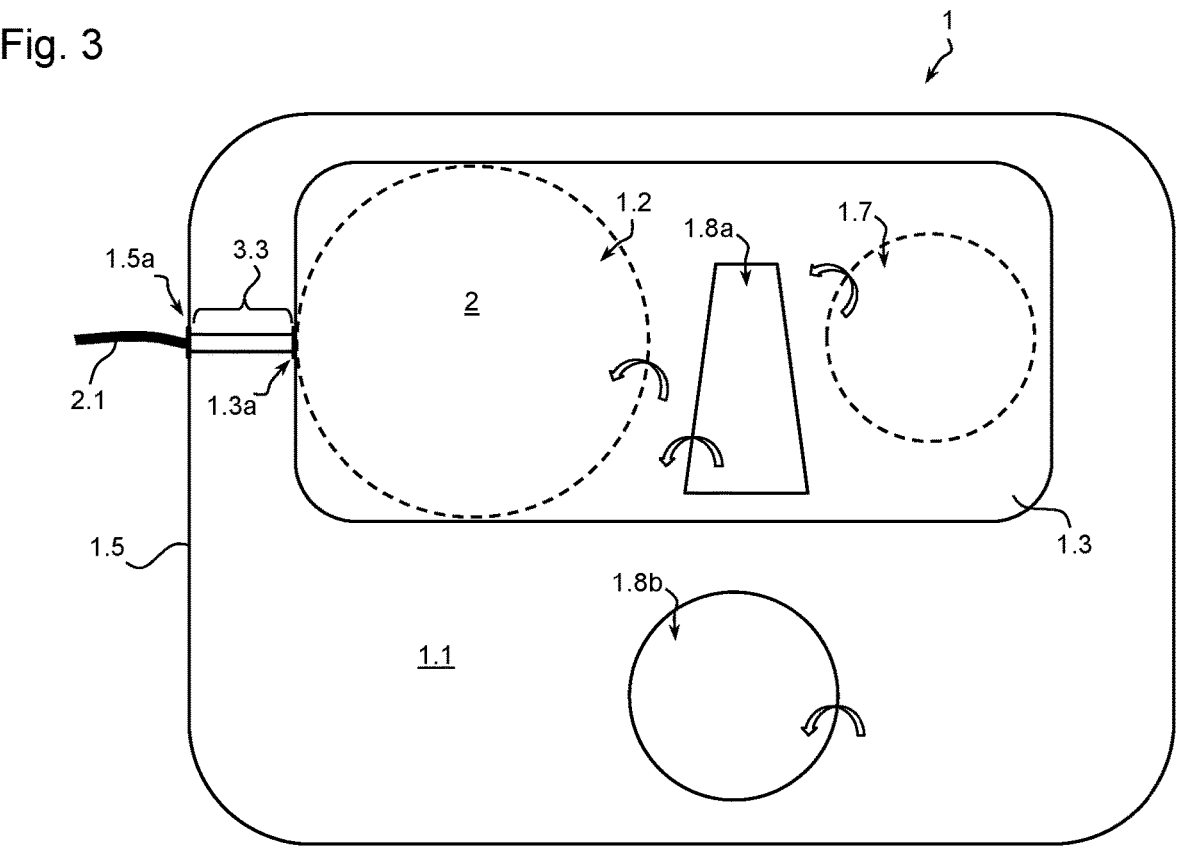
Figure 4:
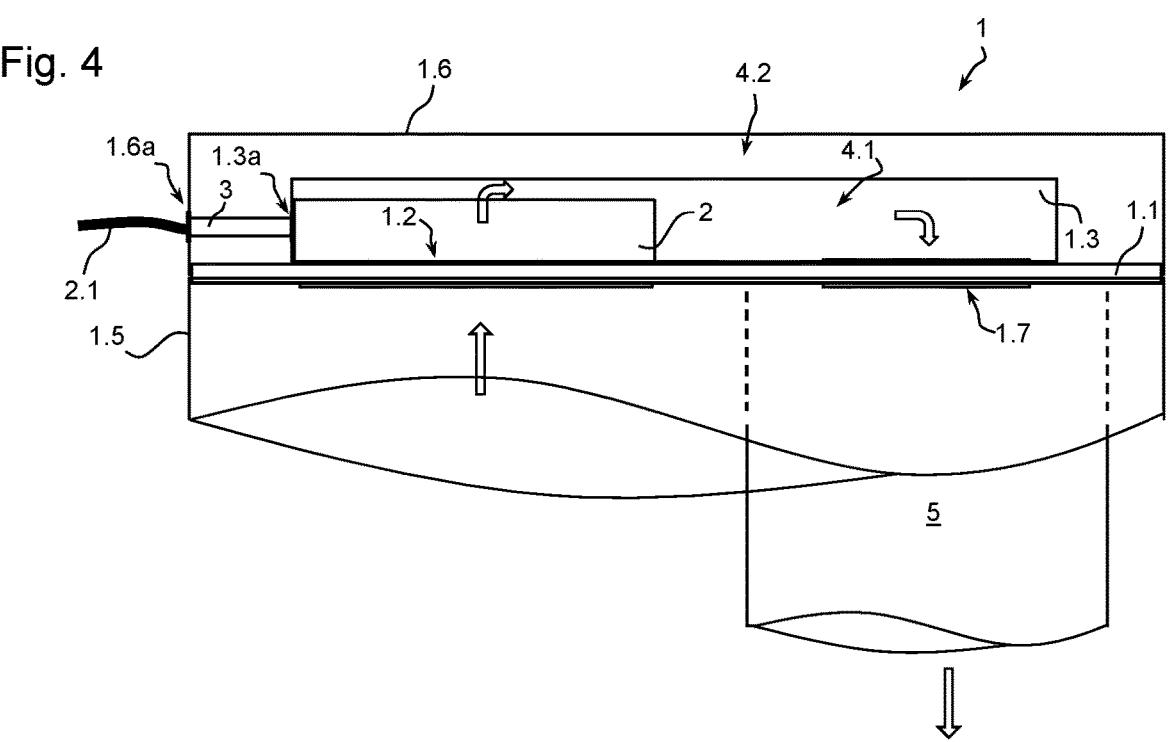

Further advantages and details of the disclosure are explained in the claims and in the description and shown in the Figures. It shows:

FIG. 1 a schematic sketch of the exhaust gas treatment unit in an exploded view;

FIG. 2 a schematic sketch of the assembled exhaust gas treatment unit;

FIG. 3 a front view in accordance with FIG. 2;

FIG. 4 a side view in accordance with FIG. 2 in an alternative embodiment.

DETAILED DESCRIPTION

Example embodiments will now be described more fully with reference to the accompanying drawings.

An exhaust gas treatment unit 1 according to FIG. 1 has a housing outer wall 1.5 and a housing wall arranged therein in form of an partition wall 1.1 as a basic element. The partition wall 1.1 comprises a first exhaust gas passage opening 1.2 and a second exhaust gas passage opening 1.7, through which exhaust gas can flow, 5 with reference to FIG. 1, from top to bottom or from bottom to top within the housing that is delimited by the housing outer wall 1.5.

In addition, the exhaust gas treatment unit 1 comprises an electrical heating element 2 with a connecting line 2.1.

Moreover, a cable duct 3 is provided for the connecting line 2.1. The cable duct 3 comprises a first and a second fastening zone 3.1, 3.2, which are positioned opposite each other at the ends. A channel region 3.3 is provided between the two fastening zones 3.1, 3.2.

As another component, a hood 1.3 is provided which is open at the bottom, as shown in FIG. 1. A further partition wall 1.9 with an exhaust gas opening 1.9a forms the upper end as shown in FIG. 1.

According to FIG. 2, the components shown in FIG. 1 in an exploded manner are assembled. With the exception of the catalytic converter, a dashed representation of concealed components has been omitted to provide a better overview. The further partition wall 1.9 forms the upper end of the housing outer wall 1.5. The housing outer wall 1.5 or the housing delimited by it is open at the bottom. In addition to FIG. 1, a catalytic converter 5 is provided, which is positioned below the first exhaust gas passage opening 1.2 of the partition wall 1.1. The two partition walls 1.1, 1.9 delimit a second exhaust gas chamber 4.2, within which the hood 1.3 and the heating element 2 that is arranged below or within it are arranged. The hood 1.3 is positioned with its open lower side against the partition wall 1.1 and attached to it. The hood 1.3 is positioned in front of the two exhaust gas passage openings 1.2, 1.7 and covers the two exhaust gas passage openings 1.2, 1.7. The heating element 2 is located at the first exhaust gas opening 1.2 and is positioned directly on the hood 1.3 in the area of the connecting line 2.1. As such, the connecting line 2.1 is routed to the outside through a connection opening 1.3a of the hood 1.3, through the exhaust gas chamber 4.2 and through an insertion opening 1.5a of the housing outer wall 1.5. In the area between the housing outer wall 1.5 and the hood 1.3, the cable duct 3 is provided, which seals off the connecting line 2.1 from the exhaust gas chamber 4.2. According to FIG. 1, the cable duct 3 comprises a first fastening zone 3.1 and a second fastening zone 3.2. The cable duct 3 is connected to the hood or cover 1.3 via the first fastening zone 3.1 or is fastened to it or supported on it. The cable duct 3 is fastened to or supported on the housing outer wall 1.5 via the second fastening zone 3.2.

The exhaust gas entering from below through the second exhaust gas passage opening 1.7 as shown in FIG. 2 enters the exhaust gas chamber 4.1 delimited by the hood 1.3 and the partition wall 1.1 and is deflected by 90° so that it flows to the heating element 2. In the area of the heating element 2, the exhaust gas is again deflected by 90° and then passes through the heating element 2, whereupon the exhaust gas flows downstream of the heating element 2 through the first exhaust gas passage opening 1.2 into the catalytic converter 5 and into the further exhaust gas treatment unit (not shown). The heating element 2 is positioned directly upstream of the first exhaust gas passage opening 1.2.

The front view in FIG. 3 shows the cross-section of the housing outer wall 1.5 or the partition wall 1.1. The hood 1.3 sits on the partition wall 1.1 above the two exhaust gas passage openings 1.2, 1.7. The connecting line 2.1 is routed via the cable duct 3 from the hood 1.3 to the housing outer wall 1.5. The partition wall 1.1 also comprises a second gas exchange opening 1.8*b*, through which exhaust gas can flow in or out.

In an alternative embodiment, the hood 1.3 comprises a first gas exchange opening 1.8*a*, as shown here in FIG. 3, through which exhaust gas can flow from the first exhaust gas chamber 4.1 into the second exhaust gas chamber 4.2 and from there back into the housing through the second gas exchange opening 1.8*b*. However, it is also possible to design the hood 1.3 without a gas exchange opening, i.e. gas-tight.

In the embodiment of FIG. 4, a housing cover 1.6 is provided as an alternative to the second partition wall 1.9. The housing cover 1.6 extends up to the height of the partition wall 1.1, where it is connected to the housing outer wall 1.5. The housing cover 1.6 comprises no gas exchange openings. The connecting line 2.1 is routed to the outside through an insertion opening 1.6*a*.

The heating element 2 is also located at the first exhaust gas passage opening 1.2 as shown in the embodiment of FIG. 4. However, in contrast to the embodiment of FIG. 2, the exhaust gas enters the heating element 2 from below through the first exhaust gas passage opening 1.2. The exhaust gas is then deflected by 90° to be guided to the second exhaust gas passage opening 1.7. Upstream of the second exhaust gas passage opening 1.7, the exhaust gas is deflected by 90° so that it flows through the second exhaust gas passage opening 1.2 into the catalytic converter 5 and into the further exhaust gas treatment unit (not shown). The heating element 2 is positioned directly downstream of the first exhaust gas passage opening 1.2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or de-scribed. The same may also be varied in many ways. Such variations are to be re-garded as a departure from the disclosure, and all such modifications are intended to be included within the scope of the disclosure.

The invention claimed is:

1. An exhaust gas treatment unit, comprising:
a housing wall comprising at least one first exhaust gas passage opening and at least one heating element for heating an exhaust gas stream, wherein the at least one heating element is placed upstream of the at least one first exhaust gas passage opening,
wherein a hood is provided which serves to be placed in front of the at least one first exhaust gas passage opening,
wherein the at least one heating element is arranged inside the hood and is placed in front of the exhaust gas passage opening;
wherein the hood together with the housing wall delimits a first exhaust gas chamber, the housing wall together with a housing cover or together with a housing outer wall and a further housing wall delimits a second exhaust gas chamber, the hood being arranged in the second exhaust gas chamber.

2. The exhaust gas treatment unit according to claim 1, wherein the at least one heating element is fastened or supported on the hood.

3. The exhaust gas treatment unit according to claim 1, wherein the hood is fastened or supported on the housing wall.

4. The exhaust gas treatment unit according to claim 1, wherein a cable duct is provided for a connecting line of the at least one heating element, the cable duct comprising a first fastening zone, via which the cable duct is fastened at an end to the hood.

5. The exhaust gas treatment unit according to claim 1, wherein the hood comprises a connection opening for passing through a connecting line, the at least one heating element being positioned directly in a region of the connection opening.

6. The exhaust gas treatment unit according to claim 1, wherein the housing outer wall and/or the housing cover are provided, a cable duct having a second fastening zone which is arranged opposite a first fastening zone and via which the cable duct is fastened at an end to the housing outer wall or to the housing cover.

7. The exhaust gas treatment unit according to claim 6, wherein the housing outer wall or the housing cover comprises an insertion opening for inserting a connecting line and/or as a receptacle for the second fastening zone of the cable duct.

8. The exhaust gas treatment unit according to claim 6, wherein the cable duct is connected to the hood in a gas-tight manner and/or that the cable duct is connected to the housing outer wall or to the housing cover in a gas-tight manner.

9. The exhaust gas treatment unit according to claim 6, wherein the cable duct and the housing cover are formed as one piece or in that the cable duct and the housing outer wall or the housing cover are formed as one piece.

10. The exhaust gas treatment unit according to claim 1, wherein a cable duct is arranged in the second exhaust gas chamber at least in a region between a first and a second fastening zone.

11. The exhaust gas treatment unit according to claim 1, wherein at least one second exhaust gas passage opening is provided in the housing wall, the hood together with the housing wall fluidically connecting the at least one first exhaust gas passage opening and the at least one second exhaust gas passage opening.

12. The exhaust gas treatment unit according to claim 1, wherein the hood comprises a first gas exchange opening via which exhaust gas can circulate between the first exhaust gas chamber and the second exhaust gas chamber.

13. The exhaust gas treatment unit according to claim 1, wherein the housing wall comprises a second gas exchange opening that is positioned outside the hood.

14. The exhaust gas treatment unit according to claim 13, wherein the second exhaust gas chamber can be charged with exhaust gas via the second gas exchange opening.

15. The exhaust gas treatment unit according to claim 13, wherein the second exhaust gas chamber together with the second gas exchange opening is designed as a closed Helmholtz resonator.

16. The exhaust gas treatment unit according to claim 1, wherein a catalytic converter is provided downstream of the at least one heating element.

17. The exhaust gas treatment unit according to claim 1, wherein one heating element is provided for each exhaust gas passage opening or one heating element is provided for several exhaust gas passage openings.

18. The exhaust gas treatment unit according to claim 1, wherein the housing wall, with the exception of the at least one first exhaust gas passage opening and with the exception of gas exchange openings, is designed to be free of exhaust gas openings.

19. The exhaust gas treatment unit according to claim 1, wherein the hood serves to divert exhaust gas flow with respect to a flow direction that is generated by the exhaust gas passage opening.

20. The exhaust gas treatment unit according to claim 1, wherein the at least one heating element is arranged within the first exhaust gas chamber delimited by the hood, wherein the at least one heating element only partially occupies this first exhaust gas chamber and can be flowed around by exhaust gas.

21. The exhaust gas treatment unit according to claim 1, wherein the first exhaust gas chamber delimited by the hood is free of additive injection devices.

22. The exhaust gas treatment unit according to claim 1, wherein the at least one heating element can be flowed through by exhaust gas or in that the at least one heating element can only be flowed through by the exhaust gas flow which passes through the respective exhaust gas passage opening at which the at least one heating element is positioned.

* * * * *